United States Patent [19]

Cooke et al.

[11] 4,361,843
[45] Nov. 30, 1982

[54] INK JET COMPOSITIONS AND METHOD

[75] Inventors: Theodore M. Cooke, Danbury; Richard G. Whitfield, Brookfield; An-Chung R. Lin, New Town, all of Conn.

[73] Assignee: Exxon Research and Engineering Co., Florham Park, N.J.

[21] Appl. No.: 248,551

[22] Filed: Mar. 27, 1981

[51] Int. Cl.$^3$ .................. G08C 9/00; C09D 11/02
[52] U.S. Cl. ............................... 346/1.1; 106/22; 106/27; 346/75
[58] Field of Search ............... 106/22, 27; 346/1.1, 346/75

[56] References Cited

U.S. PATENT DOCUMENTS 4,014,029 3/1977 Lane et al. ..................... 346/1.1
4,153,467 5/1979 Yano et al. ..................... 106/27
4,269,891 5/1981 Minagawa ...................... 428/335

FOREIGN PATENT DOCUMENTS 48-132548 11/1973 Japan.
52-17758 11/1977 Japan.

Primary Examiner—Lorenzo B. Hayes
Assistant Examiner—Amelia B. Yarbrough
Attorney, Agent, or Firm—Robert S. Salzman

[57] ABSTRACT

An ink jet composition and method of applying same is featured providing exceptionally good print quality on a wide range of printing papers. The ink composition includes a mixture of oleic acid in an approximate weight of from 20 to 80 percent of the total mixture and a dye in a dye solvent. The mixture is jetted at a temperature of approximately 135° F. The average dot circularity for a dot jetted upon the paper is approximately 0.7 or better.

18 Claims, 6 Drawing Figures

INK JET COMPOSITIONS AND METHOD

FIELD OF THE INVENTION

This invention relates to inks and an ink jet method for use in ink jet systems, and more particularly, to ink jet inks which will provide superior printing qualities upon a wide variety of printing paper surfaces.

BACKGROUND OF THE INVENTION

Inks for ink jet systems have been traditionally water-based compositions. There have been many problems associated with water-based inks. These problems include nozzle clogging, nozzle crusting, alterations in surface tension due to repeated exposure to the atmosphere during the jetting and recirculation of the ink fluid, print quality (including optical density and dot characteristics), and lack of adhesion of ink to the substrate. Many of these problems may be inter-related, e.g., alterations in surface properties of an ink caused by repeated exposure to the atmosphere during jetting and recirculation may cause nozzle clogging. Evaporation of a portion of the base liquid or absorbance of atmospheric moisture by the ink fluid may, for example, change the solubility of a particular dye in the ink fluid.

U.S. Pat. No. 3,994,736, discloses the use of polyhydric alcohols such as propylene glycol and ethylene glycol in the base liquid because of their ability to prevent the drying of the ink in the nozzle with subsequent clogging of the nozzle orifice. The polyhydric alcohols may be mixed with a lower monohydric alcohol to ensure rapid drying of the ink after deposition on the substrate to be printed.

Even with the addition of humectants to solve the drying problems, water-based inks are still troublesome because of the hydrophobic nature of most printing papers. The addition of surfactants to these inks, while improving the absorption of the inks into the paper, often severely affect the surface tension and the jetability of the ink fluid. Therefore, the printing quality of these inks is never any bettter than marginal as compared with impact printing quality.

Therefore, attention was directed towards the use of dye materials which are physically more compatible with printing paper.

A fluid medium was selected from the typewriter art, e.g. oleic acid. Oleic acid is known to provide good print quality, because it is easily absorbed into most printing papers. There are problems with the use of oleic acid as an ink jet substance, however. The oleic acid has too high a viscosity for good jetability. While additives can be used to improve the viscosity, the necessary surface tension of the ink fluid will usually fall below acceptable levels.

The present invention teaches how to properly formulate and use oleic acid as a fluid medium for ink jet printing. Part of the solution to the problem of jetability is to utilize the oleic acid compositions at elevated temperatures, generally in a range from 125° F. to 145° F. While it may have been suggested to use water-based ink jet inks at elevated printing temperatures, the use of oil based inks, and particularly, the use of oleic acid-based ink jet inks at elevated temperatures has never been described or suggested in the art. Neither has it been taught that ink jet ink formulations containing oleic acid can provide superior print quality as described herein.

DISCUSSION OF THE RELATED ART

It has been suggested that oleic acid may be used in inks for ink injection apparatuses, as shown in a Japanese Patent application to General Corp., U.S. Pat. No. 132,548, filed 11-28-73, entitled: Ink Compositions for Ink Injection Type Recording Apparatus.

This application which was published in 1975, also teaches formulating oleic acid with a DOSB nonionic surfactant, probably as a means to improve the print quality or jetability of the fluid. Also this application suggests the use of an aromatic hydrocarbon solvent of high boiling point to dissolve the dye in the oil base. Aromatic hydrocarbons, however, are not generally preferred for use in ink jet inks because of their toxic, evaporative and carcinogenic properties.

The present inventive composition does not use aromatic hydrocarbons per se, nor does the use of surfactants appear to be necessary or desirable. The aforementioned ink is not used (jetted) at elevated temperatures as is the inventive ink jet ink, and it is not demonstrated that its composition provides superior print quality as does the invention.

Another ink jet ink which comprises oleic acid is shown in the Japanese Patent application number 017,758; filed: Feb. 22, 1977 to Toyo Ink Mfg. This ink formulation comprises as one ingredient thereof: 6 acetoxy-2,4-dimethyl-m-dioxin, which is a toxic substance. Glycerin and triethylene glycol are used as solvents for colloidal magnetite (magnetic iron particles of 100Å).

There is no teaching in this application that this composition provides improved print quality of the magnitude claimed for the present invention. In addition, there is no teaching that this composition is jetted at elevated temperatures.

BRIEF SUMMARY OF THE INVENTION

The invention pertains to fluid compositions and a method for an ink jet system. The fluid compositions have a surface tension approximately greater than 35 dynes/cm. The fluid compositions provide good print quality on a wide range of printing papers such as sulfite paper, coated and uncoated paper, erasble bond, and paper containing 25, 50, 75 and 100% rag.

Print quality is defined by an average dot circularity. For the inventive composition the average dot circularity is 0.7 or better.

The circularity of a dot "T" is 1.0 for a perfectly circular dot.

The fluid compositions comprise a substantially non-aqueous printing medium including a mixture oleic acid in an approximate weight of from 20 to 80 percent of the total mixture composition. The mixture also includes a dye or a dye in a dye solvent. The solvent of the medium has a multiple function: (a) to cut the viscosity of the medium; (b) to dissolve the dye in the oleic acid; and (c) to maintain or increase the surface tension. The solvent is generally selected e.g. from a group consisting of at least one of the following: an aromatic alcohol, an aromatic ether, dimethyl sulfoxide, an alkyl pyrrolidone, methoxy- and ethoxytriglycol. More particularly, the solvent can be: n-methyl pyrrolidone, benzyl alcohol, and benzyl ether.

The dye can be selected from a group consisting of: typophor black, calco chinoline yellow, and calco oil yellow.

The mixture will generally have a viscosity of from 5 to 20 centipoises at a temperature of 135° F.

A preferred composition for the ink jet medium is approximately given as: oleic acid 34%; m-pyrol 60%; and Typophor Black 6% (by weight).

The method by which the above ink jet ink can be used for fluid printing is comprised of the following steps:

(a) formulating an ink jet medium having an approximate surface tension greater than 35 dynes/cm., comprising a substantially non-aqueous fluid mixture of: a dye and approximately 20 to 80 weight percent of oleic acid in the total mixture;

(b) jetting said ink jet medium at a temperature in an approximate range of from 125° F. to 145° F. towards a printing paper medium; and (c) forming a plurality of dots upon said printing paper medium having an average circulatity of better than 0.7.

The preferred jetting temperature is 135° F.

It is an object of this invention to provide an improved ink jet composition and method.

It is another object of the invention to provide non-aqueous ink jet formulations and a method which will produce good print quality as defined by an average dot circularity of approximately 0.7 or better.

It is still another object of this invention to provide a superior ink jet ink composition of good print quality without impairing its ability to jet properly, and without resort to toxic or carcinogenic ingredients.

These and other objects of the invention will be better understood and will become more apparent with reference to the following detailed description of the invention taken in conjunction with the accompanying drawings.

DETAILED DESCRIPTION OF THE INVENTION

Generally speaking, the invention features an ink jet ink composition and method for providing good print quality approaching that provided by typewriters and impact printers. The edge definition of a letter or character produced by an ink jet mechanism can be ascribed to the ability to form circular dots of perfect or near perfect circularity.

With the use of aqueous-based inks, this circularity is never any better than marginal and is due in part to the inability of the ink to penetrate and be absorbed by the hydrophobic papercoating.

With the use of the non-aqueous ink and method of this invention, this circularity is dramatically improved.

Figure 4:
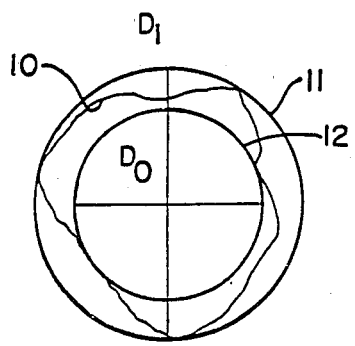
FIG. 4 is an enlarged schematic view illustrating a method of determining dot circularity.

Circularity is determined by first examining the ink dot under a microscope. FIG. 4 shows an enlarged photograph of a dot 10 as seen through the microscope, which has previously been jetted upon a printing paper.

An overlay is placed over the dot 10. This overlay comprises a number of concentric circles (not shown) of varying size. Two of these circles 11 and 12, respectively, are chosen. Circle 11 is a circle which will completely encircle dot 10. The diameter "$D_1$" of circle 11 is determined.

Circle 12 is the largest circle which encloses the area of highest optical density inside the circumference of the dot 10. The diameter "$D_o$" is determined for circle 12.

The sharpness or circularity "T" of the dot 10 is defined as the ratio of the diameters: $D_o/D_1$.

The above procedure is repeated for several dots and an average dot circularity is determined. This average dot circularity is a good indication of the edge definition or print quality of an ink jet character or letter.

Diameters of the overlaying circles from 5 to 2.5 inches are used with dot diameters of 0.01 inches when a magnification of 100× is used. Experience has shown that segregated dots are more easily found along straight lines or in lighter areas of a caricature for purposes of making the aforementioned test.

Figure 5:
FIG. 5 is an enlarged plan view of a typical aqueous ink dot.
Figure 6:
FIG. 6 is an enlarged plan view of a typical ink dot comprised of the ink composition of this invention, and delivered by the method of this invention.

Using the above definition, we can determine in a factual way the print quality of an ink composition. FIGS. 5 and 6, respectively, illustrate typical aqueous and non-aqueous ink dots. The dot shown in FIG. 6 is an ink dot comprised of the ink composition of this invention, and delivered by the method of this invention. Each respective dot was delivered on a similar kind of printing paper.

It is easily observable without any calculation that the inventive oleic acid-based ink dot of FIG. 6 has produced a superior dot when compared to the aqueous-based dot of FIG. 5.

On the average, water-based inks will produce dots with an average circularity of approximately 0.4 to 0.5.

By comparison, the average circularity of the dots products by the invention is in a range from approximately 0.7 to 0.8.

The fluid compositions of this invention have a surface tension of approximately greater than 35 dynes/cm. The fluid compositions provide good print quality on a wide range of printing papers such as sulfite paper, coated and uncoated paper, erasable bond, and paper containing 25, 50, 75 and 100% rag.

The fluid compositions comprise a substantially non-aqueous printing medium including a mixture of oleic acid in an approximate weight of from 20 to 80 percent of the total mixture composition. The mixture also includes a dye or a dye in a dye solvent. The solvent of the medium has a multiple function: (a) to cut the viscosity of the medium; (b) to dissolve the dye in the oleic acid; and (c) maintain or increase surface tension. The solvent is generally selected from a group consisting of at least one of the following: an aromatic alcohol, an aromatic ether, dimethyl sulfoxide, an alkyl pyrrolidone, methoxy- and ethoxy- triglycol. More particularly, the solvent can be: n-methyl pyrrolidone, benzyl alcohol, and benzyl ether.

The dye can be selected from a group consisting of: typophor black, calco chinoline yellow, and calco oil yellow.

The mixture will generally have a viscosity of from 5 to 20 centipoises at a temperature of 135° F.

A preferred composition for the ink jet medium is approximately given as: oleic acid 34%; m-pyrol 60%; and Typophor Black 6% (by weight).

The method by which the above ink jet ink can be used for fluid printing is comprised of the following steps:

(a) formulating an ink jet medium having an approximate surface tension greater than 35 dynes/cm., comprising a substantially non-aqueous fluid mixture of: a dye and approximately 20 to 80 weight percent of oleic acid in the total mixture;

(b) jetting said ink jet medium at a temperature in an approximate range of from 125° F. to 145° F. towards a printing paper medium; and (c) forming a plurality of dots upon said printing paper medium having an average circularity of better than 0.7.

The preferred jetting temperature is 135° F.

Specific compositions for the ink jet fluid of this invention are tabulated in weight percentages in Table I below:

TABLE I

| Formula: | 1 | 2 | 3 | 4 | 5 |
|---|---|---|---|---|---|
| Oleic Acid | — | 19.2 | 9.2 | — | 10.2 |
| MeOTG | 75 | — | — | — | — |
| Typophor Black | 25 | 20 | 20 | 20 | 24 |
| DMSO | — | — | — | — | — |
| M—Pyrol | — | 60 | 70 | 79.2 | 65 |
| Calco Chinoline Yellow | — | 0.8 | 0.8 | 0.8 | 0.8 |
| Calco Oil Yellow | — | — | — | — | — |
| Benzyl Ether | — | — | — | — | — |

| Formula: | 6 | 7 | 8 | 9 | 10 |
|---|---|---|---|---|---|
| Oleic Acid | 6.2 | 1.2 | 10.8 | 30 | 19.2 |
| MeOTG | — | — | — | — | — |
| *Typophor Black | 26 | 28 | 24 | 20 | 20 |
| DMSO | — | — | — | — | 60 |
| M—Pyrol | 67 | 70 | 65 | — | — |
| Calco Chinoline Yellow | 0.8 | 0.8 | 0.2 | — | — |
| Calco Oil Yellow | — | — | — | — | 0.8 |
| Benzyl Ether | — | — | — | 50 | — |

| Formula: | 11 | 12 | 13 | 14 | 15 |
|---|---|---|---|---|---|
| Oleic Acid | 9.2 | 29.2 | 4.2 | 20 | — |
| MeOTG | — | — | — | — | — |
| *Typophor Black | 20 | 20 | 20 | 24 | 26 |
| DMSO | — | — | — | — | 60 |
| M—Pyrol | 70 | 50 | 75 | 73.2 | 73.2 |
| Calco Chinoline Yellow | — | — | 0.8 | 0.8 | 0.8 |
| Calco Oil Yellow | 0.8 | 0.8 | — | — | — |
| Benzyl Ether | — | — | — | — | — |

The following table (Table II) gives typical viscosities for various formulations of oleic acid, n-methyl pyrrolidone (m-pyrol) and typophor black at approximately 70° F. and 135° F.

TABLE II

| Formula: | 1 | 2 | 3 | 4 | 5 | 6 |
|---|---|---|---|---|---|---|
| Oleic acid | 80 | 60 | 40 | 65.0 | 50.0 | 30.0 |
| M—Pyrol | 0 | 20 | 40 | 15.0 | 30.0 | 50.0 |
| *Typophor black | 20 | 20 | 20 | 20 | 20 | 20 |
| Viscosity @76° F. | 48.5 | 31.6 | 17.8 | 43.41 | 27.21 | 11.6 |
| (centipoises) @135° F. | 19.5 | 12.0 | 9.01 | 15.51 | 11.2 | 7.0 |

Even though the ink fluid formulations above give typical high viscosities of 10 to 20 cps and typically low surface tension of 35 dynes/cm., they provide a non-drying, non-hygroscopic uniform drop which prints on a broad range of papers.

Figure 1:
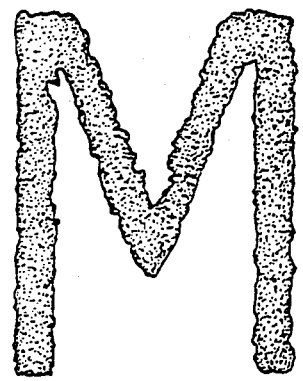
FIG. 1 is an enlarged plan view of a Letter "M" formed by a typewriter font which has impacted upon a typical printing paper.
Figure 2:
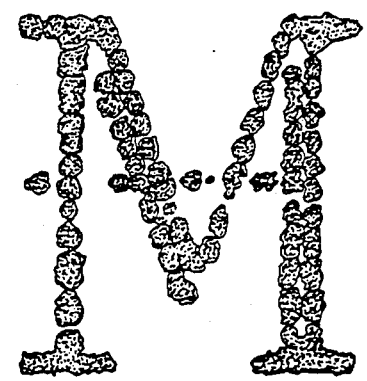
FIG. 2 is an enlarged plan view of a letter "M" formed by an ink jet system using an aqueous ink.
Figure 3:
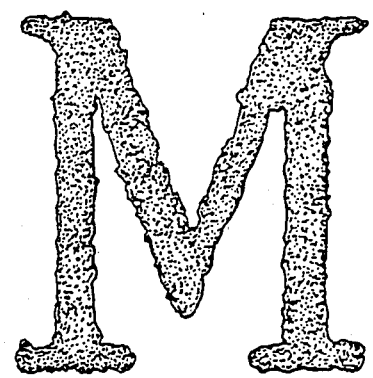
FIG. 3 is an enlarged plan view of a letter "M" formed by an ink jet system using the ink composition and method of this invention.

Referring to FIGS. 1 through 3, enlarged plan views of a letter "M" are illustrated for various printing techniques on similar printing paper. FIG. 1 depicts an ideal character formed by impact via a typewriter font. It can be observed that the edge definition is very good.

FIGS. 2 and 3 depict a letter "M" respectively formed by an impulse ink jet system having an orifice of from approximately 1.9 to 3.2 thousandths of an inch and delivering approximately 1500 dots/sec.

FIG. 3 illustrates the "M" formed by the inventive composition of: oleic acid 19.2%; m-pyrol 60.0%; Typophor Black 20%; and calco chinoline yellow 0.8% (by weight), which was jetted at 135° F. Note that the edge definition approached that of the ideal typewriter character of FIG. 1.

By contrast in an opposite sense, the same letter "M" is shown in FIG. 2 using an aqueous ink composition of: 15% ethylene glycol; 54% water; 2% diethylene glycol; 1% glycerol; 8% m-pyrol; and 20% pontamine Black SP (by weight). It is observed that the aqueous ink fluid did not provide a good quality print.

It is obvious from the above comparisons that the non-aqueous ink of this invention has produced a superior print quality of exceptionally good edge definition.

Having met the objectives set forth earlier in this specification, what is desired to be protected by Letters Patent is presented in the following appended claims.

What is claimed is:

1. A fluid composition which has a surface tension greater than approximately 35 dynes/cm. and which can provide good print quality defined by an average dot circularity of approximately better than 0.7 for a wide range of printing papers such that it is suitable for use as an ink in ink jet systems, comprising a substantially non-aqueous printing medium including a mixture of oleic acid in an approximate weight of from 20 to 80 percent of the total mixture composition and a dye in a dye solvent, said solvent selected from a group consisting of at least one of: an aromatic alcohol, an aromatic ether, dimethyl sulfoxide, an alkyl pyrrolidone, methoxy- and ethoxy- triglycol.

2. The fluid composition of claim 1, wherein said solvent comprises n-methyl pyrrolidone.

3. The fluid composition of claim 1, wherein said solvent comprises benzyl alcohol.

4. The fluid composition of claim 1, wherein said solvent comprises benzyl ether.

5. The fluid composition of claim 1, wherein said dye is selected from a group of at least one of: typophor black, calco chinoline yellow, and calco oil yellow.

6. The fluid composition of claim 1, wherein said mixture has a viscosity in the range of from 5 to 20 centipoises at a temperature of 135° F.

7. The fluid composition of claim 1, wherein said mixture has a viscosity in the range of from 10 to 40 centipoises at a temperature of 76° F.

8. The composition of claim 1, comprising: oleic acid 34%; m-pyrrolidone 60%; and Nigrosine Black 6% by weight.

9. A fluid composition which has a surface tension greater than approximately 35 dynes/cm. and which can provide good print quality defined by an averge dot circularity of approximately better than 0.7 for a wide range of printing papers such that it is suitable for use as an ink in ink jet systems, comprising a substantially non-aqueous printing medium including a mixture of oleic acid in an approximate weight of from 20 to 80 percent of the total mixture composition and a dye.

10. The fluid composition of claim 9, wherein said dye is selected from a group of at least one of: typophor black, calco chinoline yellow, and calco oil yellow.

11. A method of fluid printing, comprising the steps of:
(a) formulating an ink jet medium having an approximate surface tension greater than 35 dynes/cm comprising a substantially non-aqueous fluid mixture of: a dye and approximately 20 to 80 weight percent of oleic acid in the total mixture;
(b) jetting said ink jet medium at a temperature in an approximate range of from 125° F. to 145° F. towards a printing paper medium; and
(c) forming a plurality of dots upon said printing paper medium having an average circularity of better than 0.7.

12. The method of claim 11, wherein the temperature of said medium in said jetting step (b) is approximately 135° F.

13. The method of claim 11, wherein said fluid mixture is formulated according to step (a) with the following composition: oleic acid 34%; m-pyrrolidone 60%; and Nigrosine Black 6% by weight.

14. The method of claim 11, wherein said medium is jetted onto a sulfite paper.

15. The method of claim 11, wherein said medium is jetted onto a coated paper.

16. The method of claim 11, wherein said medium is jetted onto an uncoated paper.

17. The method of claim 11, wherein said medium is jetted onto a paper containing at least 25% rag.

18. The method of claim 11, wherein said medium is jetted onto an erasable bond paper.

* * * * *